United States Patent Office 3,092,950
Patented June 11, 1963

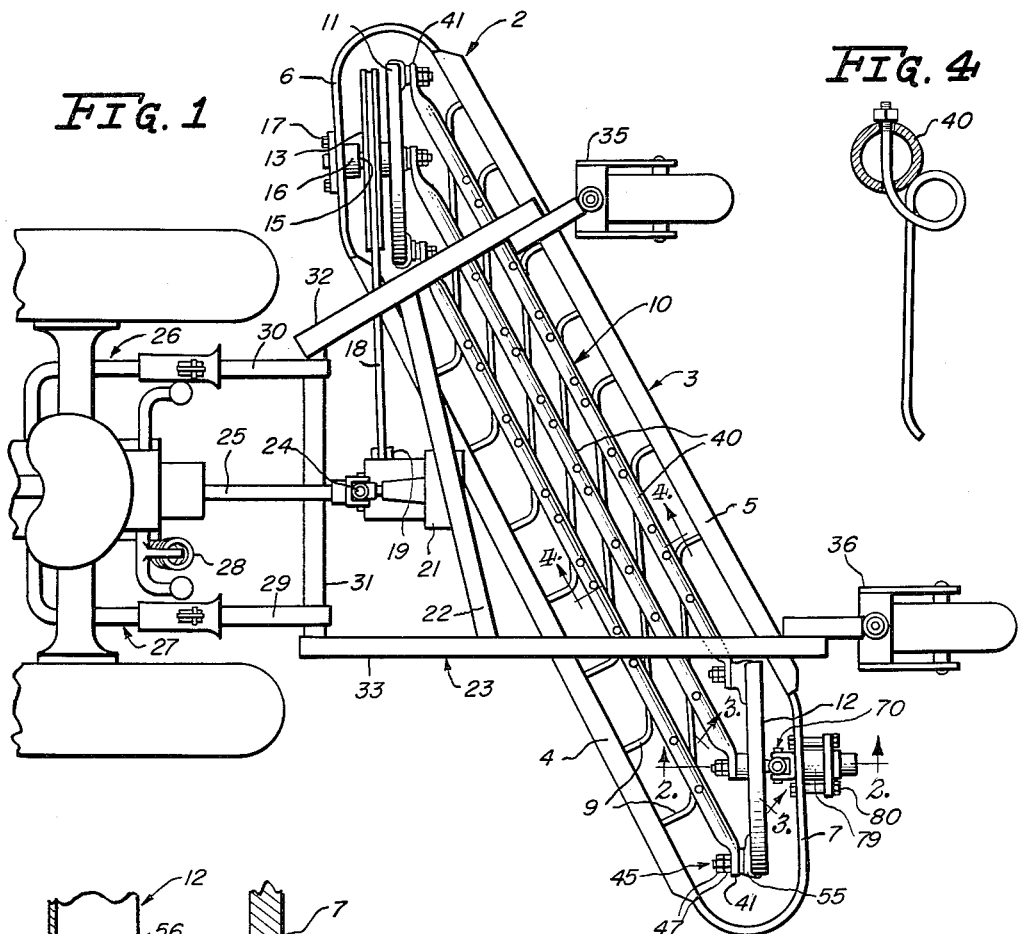

3,092,950
PARALLEL BARS SIDE DELIVERY RAKE WITH SELF ADJUSTING MOUNTING MEANS
Edward J. Johnston, La Grange Park, Ill., assignor to International Harvester Company, Chicago, Ill., a corporation of New Jersey
Filed Apr. 12, 1961, Ser. No. 102,474
2 Claims. (Cl. 56—377)

This invention relates to rakes and more specifically to a novel parallel bar side delivery rake.

Side delivery rakes of current construction embody a reel which comprises a pair of end members which are mounted on parallel laterally and axially offset axes, the end members being interconnected by tine bars which move with the end members about their axes of rotation. It is practically impossible to so construct a rake wherein the axes of rotation of the end members are absolutely parallel and for this reason provisions have been made to obtain relative movement between the end members and the tine bars. These provisions take the form of rubber bushings or gaskets between the bars and the end members or in slidable connections between the end members and the bars. Each of these provisions impose a high cost penalty on the manufacture of the rake in that the rubber mountings require extensive housings or castings for encompassing the rubber and this has been extremely problematical in that the rubber has been rapidly deteriorating and wearing out. The provision of slidable connections entails the manufacture of expensive connections in the nature of castings and bolt nut assemblies, etc., which are not only subject to wear but in service become loose, etc.

It is a general object of the invention to provide a novel, simple arrangement for controlling the disposition of the mounting of the end members such that the connections between the bars and the end members may be simplified and at the same time the operation or operativeness of the reel is assured.

A more specific object of the invention is to provide for rake reel for a side delivery rake of the parallel bar type a novel mounting for one of the end members in the form of a universal joint whereby the member which is mounted on the universal joint is controlled in its axis of rotation and movement by the opposite end member which is mounted on a fixed axis wherefor the end members operate on correlated axes such that the parts are accommodated, movement and on self-adjusting axes.

These and other objects and advantages inherent in and encompassed in the invention will become more readily apparent from the specification and the drawings wherein:

FIGURE 1 is a plan view of a rake embodying the invention, the rake being shown connected and mounted on an associated tractor fragmentarily shown:

FIGURE 2 is an enlarged sectional view taken substantially on the line 2—2 of FIGURE 1;

FIGURE 3 is an enlarged sectional view taken substantially on the line 3—3 of FIGURE 1; and FIGURE 4 is a transverse enlarged sectional view taken substantially on the line 4—4 of FIGURE 1.

Describing the invention in detail and having particular reference to the drawings, there is shown a rake generally designated 2 which comprises a basket generally indicated 3 including front and rear beam members 4 and 5 which are interconnected by end beam members 6 and 7. The basket is provided with a plurality of stripper bars 9 which extend between the front and rear members 4 and 5 beneath the rake reel generally designated 10.

The reel 10 comprises front and rear end members or plates 11 and 12, the front member being connected to a sheave or a pulley 13 which together with the member 11 is spindled or journalled on a fore-and-aft extending shaft 15 which is mounted in a support structure 16 suitably connected as by bolts 17 to the end beam member 6 of the rake basket. There is a belt 18 trained about the pulley 13 which in turn is trained about the pulley 19 which is suitably driven from the gear box 21 mounted on a crossmember 22 of the rake frame generally designated 23. It will be seen that the input to the gear or input transmission 21 is connected through a universal joint 24 to the power take-off shaft 25 of a tractor generally designated 26 which provides a hitch structure 27 hydraulically operated by the ram means 28 for lifting and lowering the rake through the medium of the hitch elements 29 and 30 which are telescoped within the hitch 26, the elements 29 and 30 being connected to a crossmember 31 which is interconnected with the main beam members 32 and 33 of the main frame 23 of the rake frame, the beam members 32 and 33 being connected at their rear extremities to the caster wheel means 35 and 36 which support the rear end of the basket. Thus, it will be seen that the drive from the tractor, which is optional inasmuch as this rake may be ground driven as well known to those skilled in the art, is directed to the end member 11.

The end members or spiders 11 and 12 are interconnected by a plurality of parallel tine bars 40 each of which is a tubular member preferably in the form of a pipe or a cylinder and has flattened outer ends 41 which are reversely angled and disposed at an obtuse angle to the longitudinal axis of the bar. For strength purposes each end is provided with a tubular insert 42 which is bent or deformed with the end portion 41 to provide a flattened part through which there is formed an opening 43 which admits the shank portion 44 of a mounting stud 45 therethrough, the stud having an outer end threaded portion 46 admitting a pair of nuts 47 thereon which are adapted to engage and be tightened against the outer side 48 of the related end portion 41. The inner side of the end portion engages a shield 49 which has a radial portion 51 engaging the spacer 52 which is sleeved on the shank portion, the shield 49 also having a peripheral axially directed sealing flange 53 which overlaps the adjacent end 54 of a bearing housing 55. The housing 55 is mounted upon a radial plate portion 56 of the associated end member. The housing 55 carries an outer race 57 which guides a single row of ball bearings 58 about the multi-part race structure 59 and 60 on the inner end of the spacer member 52 and the head 61 on the inner end of the shank portion 44 of the stud 45. The stationary spacer 52 may be provided with a peripheral sealing ring of any suitable sealing material 62 which may engage a shoulder 63 on the outer race.

Thus it will be seen that a simple bearing mounting is provided at each end of the tine bar in that the tine bar is of extremely simple construction at its end portions having its ends merely deformed or flattened and provided with an aperture and being sleeved on the stud shaft.

The principal invention resides in the provision of a novel universal mounting 70 for the driven plate member 12 and this universal mounting comprises a pair of universally connected joint members 71 and 72 which are interconnected by the universal cross 73, the member 71 is connected to a radial flange 74 which peripherally is connected to the radial plate 56 of the member 12 by means of a plurality of bolts 75. The member 72 is provided with a stub shaft 76 which mounts a pair of axially spaced bearings 77 and 78 which in turn are mounted within the housing 79. The housing 79 is connected as by bolts 80 to the end beam or bar 7 about an opening 81 therein through which the universal joint 70 operates. It will be understood that the mounting of the universal joint in this particular instance on the member 7 is immaterial and that the concept of the invention is to provide a universal mounting for one of the end members of the parallel bar side delivery rake and to rigidly mount the other member on a fixed axis so that the member on the fixed shaft and its axis of rotation determines the axis of rotation of the member on the universal joint. Thus the principal problem of trying to maintain the two end members rotating on parallel axes is solved in that the member which is mounted on tht stationary axis or shaft will control and have the end member which is mounted on the universal joint automatically follow the path of the other end member. It will be understood that the term "universal joint" as used herein encompasses any and all structures which will accomplish the foregoing objective of allowing the associated end member to follow the movement of the other end member.

The instant construction obviates the necessity for providing expensive end mountings or the quickly deteriorating flexible bushings and obtains large savings in manufacture and produces a highly satisfactory product.

It will be understood that a preferred form of the invention has been shown for the purposes of disclosures and that other embodiments of the invention will become readily apparent to those skilled in the art within the scope of the appended claims.

What is claimed is:

1. In a side delivery rake of the parallel bar type, a support, a pair of rake end members, tine bars interconnecting the members, each member including a center portion, universal mounting means journalling one of the members through said center portion and mounted on said support, and a shaft journalling the other member through its center portion and rigidly fixed to the support, said universal mounting means operative to cause said end members to rotate in substantially parallel planes at all times.

2. In a parallel bar side delivery rake, a support, a rake reel having a pair of end members and interconnecting tine bars, means on the support mounting said end members for rotation on substantially parallel laterally and axially offset axes, one of said means providing a rigid mounting and the other of said means comprising a universal joint having a plurality of universally interconnected parts, one part fixed to the frame and the other directly mounting the associated member, said universal joint constantly positioning the end member mounted thereby to rotate at all times in a plane parallel to the plane of rotation of the other end member.

References Cited in the file of this patent

UNITED STATES PATENTS

| | | |
|---|---|---|
| 2,597,828 | Spurlin | May 20, 1952 |
| 2,621,466 | Kopp | Dec. 16, 1952 |
| 2,635,412 | Schroeppel | Apr. 21, 1953 |
| 2,667,027 | Hauswirth | Jan. 26, 1954 |
| 2,929,192 | Hill | Mar. 22, 1960 |